March 15, 1966      J. A. NICOSIA      3,239,982

REINFORCED SYNTHETIC RESIN STRUCTURAL PANEL

Filed April 12, 1962

INVENTOR.
JOSEPH A. NICOSIA
BY
ATTORNEYS

United States Patent Office 3,239,982
Patented Mar. 15, 1966

3,239,982
REINFORCED SYNTHETIC RESIN STRUCTURAL PANEL
Joseph A. Nicosia, 21W030 Shelley Drive, Itasca, Ill.
Filed Apr. 12, 1962, Ser. No. 186,992
10 Claims. (Cl. 52—309)

This invention generally relates to a building board and the method of making said board and more particularly to the method of making a building board of foamed synthetic resin.

Foamed synthetic resins, such as polyurethane, are known to have excellent insulating properties as well as excellent abrasion and wear resistance. These foams have been primarily used in the building field as fillers for building materials. Usually the building material, such as plywood, sandwiches the polyurethane foamed resin. This took advantage of the excellent insulating properties of polyurethane foam resin. However, the plywood was necessary because the foamed polyurethane lacked the structural strength necessary to withstand the stresses it would encompass if used as the sole building material. Therefore, the prior building manufacturers use plywood or other building material to supply the necessary structural strength to molded foam synthetic resins.

Polyurethane and other synthetic foam resins have been molded to form a wall board. These molded foams, however, are brittle and as stated before, lack any degree of structural strength. These boards, however, are not used for example, as a curtain wall but are used mainly where strength and brittleness are not a factor—merely as a wall covering such as plasterboard.

The present invention utilizes a foamed synthetic resin building board which has the beneficial abrasion resistance properties, wear resistance properties, insulating properties of foamed synthetic resins and also has the necessary strength rigidity to withstand the stresses encountered by load bearing building boards such as curtain walls.

It is therefore an object of the present invention to provide a reinforced foamed synthetic resin building board.

Still another object of the present invention is to provide a foamed synthetic resin building board which may be used as a curtain wall of a house or similar building structure.

It is still another object of the present invention to provide a method of forming a foam polyurethane structural building board.

It is still another object of the present invention to provide a polyurethane foam reinforced building board.

Other objects, features and advantages of the present invention will be apparent from the following detailed description taken in conjunction with the accompanying figures of the drawings.

Figure 1:
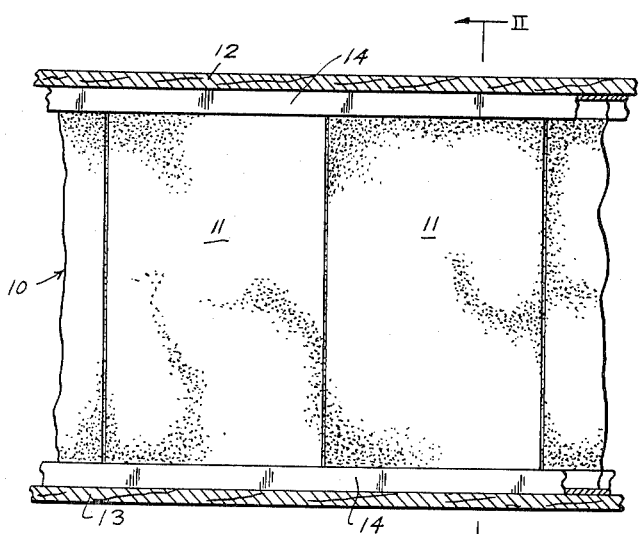
FIGURE 1 is an elevational front view of installed building panels constructed in accordance with the present invention.

The structural boards and panels of the present invention are made from any suitable foamed synthetic resin i.e. foamed polystyrene beads such as Pelaspan 8 and Pelaspan 18 polystyrene flakes, epoxy resin, polyurethane of the polyester and polyurethane of the polyether type. The load bearing panels of the present invention are formed by conventional methods of forming and molding synthetic resins. The panels will be constructed either by batch hand pour, mechanically mixed or froth foam and will be cured by the room temperature or elevated temperature methods. The elevated temperature methods will use internal heating elements such as steam, hot oil or electrical means within the mold or the external methods with a box or batch type oven. The density of the molded foam synthetic resin board with the reinforcement embedded therein is between 1.7 to 15 pounds per cubic foot.

A preferred synthetic resin for the structural board of the present invention is polyurethane. The panel is formed by preparing an essentially homogeneous foamable mixture of polyisocyanate, an active hydrogen containing organic substance capable of forming polyurethane structure with said polyisocyanate, and a foam blowing agent. Pouring this mixture, which contains a sufficient blend for generating a resultant body of foam that will exert positive pressure on the mold surface, into the mold. Permitting foaming and curing of the blend in the mold whereby the resultant positive pressure forms a smooth-skinned article, and removing from the mold an article of smooth appearance having a foamed core structure.

For foaming and curing of the product it has been preferred to use an enclosing mold having the reinforcing means attached in place in the mold and overcharging the mold with reactant mix, i.e., there is more mix poured into the mold than would be necessary to just fill the total mold cavity with foam. The excess charge of mix results in a foam that exerts a positive pressure, that is, about 2 to 20 p.s.i., on all mold surfaces which helps produce a skin on the molded article and enhances its final appearance as discussed above. A bleeder may be used to control mold pressure.

The panel may also be produced by use of a froth foaming method whereby a gun has a mixing nozzle so that as the material may be mixed and discharged into the panel mold.

A board of the present invention is provided by taking a foamable mixture of 100 parts by weight resin and 87 parts by weight of prepolymer, and vigorously agitating at 78° F. The mixture is then poured into mold. The mold is capped and locked. After the foaming action has stopped and subsequently cured, the mold is dismantled, the plugs removed, and the finished smooth, curtain-wall panel is ready for installation.

Either the semi-prepolymer or the one-shot formulation technique is acceptable for preparing the polyurethane (polyester or polyether) foamable mixture for use in this invention. In the semi-prepolymer process the total polyisocyanate called for in the formulation is premixed with less than all of the active hydrogen-containing compound of the final product, the reaction is allowed to take place between these two components. This resulting semi-prepolymer is then vigorously blended with the remaining formulary ingredients plus the rest of the active hydrogen-containing compound to form a foamable mixture.

In the one-shot technique all the ingredients called for in the formula are initially vigorously mixed so that conversion of raw ingredients to a foamable mixture is accomplished in a single stage. With either technique a homogeneous mixture of foamable ingredients is made. Either technique dyes or pigments can be added during the processing of the raw materials. After vigorous mixing, the resulting mixture will be colored in a uniform manner in correspondence with these dyes, stains, pigments, or combination thereof. Therefore, the foamable mixtures may be the color of the formulary ingredients or that a pigment or dye addition.

Any polyurethane foam type is suitable for the making of a board of the present invention, i.e. rigid, semi-rigid, or flexible. In this connection, organic compounds containing active hydrogen include those wherein such hydrogen content is small, resulting in minimal polymer cross-linkage and those of greater active hydrogen content. The former compounds produce flexible foams whereas the latter compounds initiate greater chain cross-linkages and can play a part in forming semi-flexible or rigid foams. Additionally, combinations of urethane group reactive hydrogens with isocyanate can be taken advantage of to give polymer cross-linking and resultant foam rigidity. Small amounts of water may be added to combine with the isocyanate group to form an amine. The amine will react with isocyanate to give a urea, which will then react in a polymer cross-linking manner with additional isocyanate to form biuret bridges. To biuret bridges add further strength to the foam structure.

The foam forming reaction can be manipulated by conventional catalysts, and the cell size of the foam may be controlled by the addition of suitable surfactants such as conventional silicone oil or polyglycol-silicone polymer. Examples of reaction catalysts include n-methylmorpholine, tetramethylbutanediamine, tri-ethylenediamine, stannous octoate, and bibutyl tin dilaurate.

Foaming of the reactants is conventionally handled by either dissolving a blowing agent in the foamable mixture of by adding water to such a mixture. In water addition, carbon dioxide for foaming will be produced by either the reaction between an isocyanate and water to form an amine or it will be produced when water reacts with the urethane linkage of a semi-propolymer mix. If the water addition method is not employed, suitable conventional halogenated propellants such as dichlorodifluoromethane, trichloromonofluoromethane, trifluoromonochloromethane and mixtures of same may be added to the mixture for foaming.

The present invention provides the building industry with a light weight board and panel that are used to construct a house, apartment building, motels, and similar structure. The boards and panels of the instant invention may be conveniently handled and rapidly installed by relatively few workers. As a result the over-all cost of the building is drastically reduced. Reduction in cost, of course, is a major consideration in the highly competitive building industry.

The building boards of the present invention are made from reinforced foamed synthetic resin and not only reduce the cost of comparative size building but also provides building structures of longer endurance. The reinforced foamed synthetic resin board or panel has excellent strength to resist structural stresses encountered; has excellent insulating properties to reduce the cost of heating or cooling the building; has excellent wear, abrasion and weather resistance; and may easily be provided with additional materials to give it any desired beneficial properties.

Although the drawings illustrate the panels and boards of the instant invention as being used as a curtain wall, it is of course understood that these various embodiments are merely to exemplify my invention and is in no way meant to limit the boards for use as curtain walls. The boards and panels of the present invention are advantageously used in a building structure having barriers of various types which may comprise a ceiling, flooring, outside walls, and in any manner that building boards and panels are generally used.

Referring to FIGURE 1, there is shown a curtain wall 10. The curtain wall is composed of a plurality of reinforced foam synthetic resin wall panels 11 provided in accordance with the present invention. The panels 11 are fastened to a ceiling support 12 and a floor support 13 by rectilinear U-brackets 14. The U-brackets 14 are fastened to the floor and ceiling supports screws 15 or any suitable attaching means.

The panel 11 has stepped top and bottom ends with steps 16 and 17 respectively. The steps 16 and 17 are formed so that panel may sit in flush contact with the U-brackets 14, as is shown in FIGURE 2, and present a relatively even surface therewith.

Figure 2:
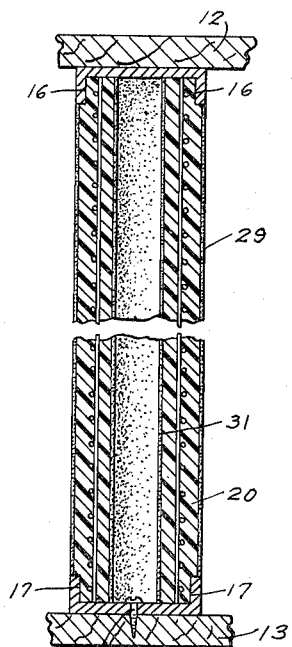
FIGURE 2 is an elevational side view taken along the lines II—II of FIGURE 1.
Figure 3:
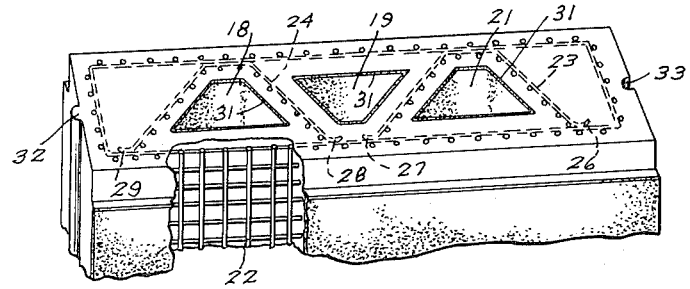
FIGURE 3 is an elevational top view partially of the building panel of the present invention, with some parts broken away to show underlying parts.

The panel 11, as illustrated in FIGURES 2 and 3, defines three passageways 18, 19, and 21 with identical trapezoidal cross-sections. The particular number and configuration of the passageways can be varied in accordance to particular desires of the builder. The passageways provide the panel with an increased sound proofing quality and advantageously provide the panel with ducts used to conduct heat or cooling air to the house. The passages also provide a means for supplying the necessary duct work for plumbing, wiring, and similar types of installations.

The panel has reinforcing screens 22, 23 and 24 embedded in a foam synthetic resin body 20. The screens extend the entire length of the panel. Screen 22 is rectangular and extends around the entire perimeter of the panel and spaced approximately the same distance inward from all the sides of the panel; screen 23 surrounds three sides of the trapezoidal passage 21, is affixed to the screen 22 at 26 and 27, and forms with screen 22 a trapezoid surrounding passage 21 and concentric therewith; screen 24 surrounds three sides of the trapezoidal passage 18, is affixed to the screen 22 at 28 and 29, and forms with screen 22 a trapezoid surrounding passage 18 and concentric therewith; and screen 22, 23 and 24 form a trapezoid surrounding passage 19 and is concentric therewith.

A typical reinforcing screen is quarter inch wire welded steel rods having a No. 3 to a No. 7 type mesh. It is of course understood that wire screens are not the only type of reinforcing means that we may use. Embedded rods, expanded metal lathes, and similar means are applicable to provide the reinforced foamed synthetic resin structural building panel or board of the present invention.

The wall panel illustrated by FIGURES 1–3 has a thin asbestos covering 29 on the faces thereof and a thin asbestos covering 31 around the entire perimeter of the passageways 18, 19 and 21. The asbestos covering aids in supplying fire proofing and heat resistance to the wall panel. It is fastened to the wall panel in any suitable manner i.e. bonded thereto with an adhesive molded thereto during the molding of the wall panel, and by any suitable mechanical fastening means.

It is, of course, understood that the asbestos cover is not necessary. The outer surface of the board may form the wall face. Synthetic resins are easily dyed prior to pre-forming and therefore may have a colored wall that needs no additional plastering or painting. However, if painting or plastering is desired, the foam synthetic resin has a surface which is readily adaptable for such finishing.

The panels are connected to each other by a tongue and groove connection. Each panel 11 has a tongue 32 and a groove 33 formed thereon. The tongue and groove extend the entire length of the panel. It is, of course, understood that any suitable type of connecting means may be utilized to align the boards with one another.

Figure 4:
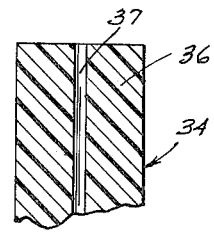
FIGURE 4 is a partial cross-sectional side view building board constructed in accordance with another embodiment of the present invention.

It is not necessary to have passages formed throughout the panel. Panels with passageways are preferred because they not only reduce the weight of the panel, and improve sound proofing, but also less material is needed. However, as is shown in FIGURE 4, where a solid panel and a solid board is desired, the passages may be eliminated and a solid panel 11 provided. The solid panel has a foam synthetic resin body 36 with reinforcing rods 37 embedded therein. It is, of course, understood that any of the previously mentioned reinforcing means may be used instead of the rods 37.

Figure 5:
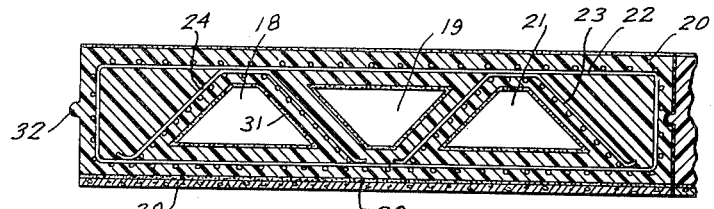
FIGURE 5 is an elevational top view of a building board constructed in accordance with another embodiment of the present invention.
Figure 6:
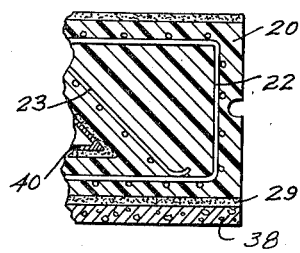
FIGURE 6 is a partial blown-up section of FIGURE 5.

Another beneficial aspect of the present invention is brought out by FIGURES 5 and 6. The load bearing boards or load bearing panels 11 of the present invention have a veneer facing 38 attached thereto. This veneer facing may take the form of wood, brick, marble, tile, and any similar material.

The veneer facing is illustrated as being only on one side of the panel and fastened to the asbestos covering 29. However, this is merely for illustrative purposes only and the veneer may be placed on both sides of the panel and the asbestos covering may be eliminated. Therefore, a builder using the panels of the present invention for a curtain wall, is able to provide walls for one room with a wood finish while the walls that are formed by the same panels in an adjacent room may have a different type of finish. This is also applicable when the panels of the instant invention are used for the exterior walls of the building. The exterior surface may be provided with a brick facing and the interior with another facing such as wood.

This type of veneer finishing allows the builder to provide a wall with inexpensive wood face or expensive marble face at relatively a fraction of the cost of using the material in its non-veneer form. The veneer facing is fastened to the panel in any suitable manner i.e. bonded thereto with an adhesive, molded thereto during remolding of the wall panel, and by any suitable mechanical fastening means. The veneer lends no structural strength to the board of the present invention, but is utilized merely to give an exterior beautification of the panel of the present invention. As is realized, the veener will slightly add to the weight of the board, but the board is still appreciably lighter than structural boards presently used.

FIGURE 6 illustrates an additional feature of the present invention. A metal duct 40 may be inserted in the passages for the reasons discussed below.

Figure 7:
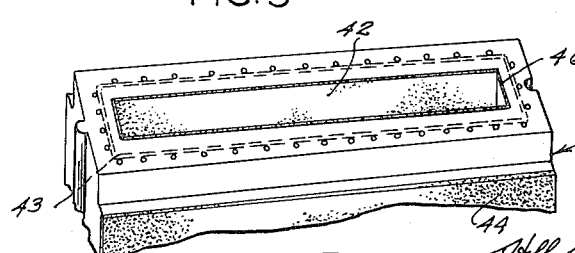
FIGURE 7 is a perspective top elevational view of a building board constructed in accordance with another embodiment of the present invention.

FIGURE 7 illustrates the embodiment of the present invention wherein a molded foamed synthetic resin panel 41 has a single rectangular passageway 42. Around the perimeter of the passageway and concentric therewith is a reinforcing wire screen 43. The panel faces and the inner surfaces of the passageway have respective asbestos coverings 44 and 46.

It will be understood that modification and variations may be effected without departing from the scope of the novel concepts of the present invention.

I claim as my invention:

1. In a building structure having walls, the improvement comprising
   a structural building panel comprising a component of at least one of said walls and with said panel being arranged to carry compressive loading,
   said panel comprising a rigid type foam body comprised of a molded synthetic resin having exterior longitudinally extending body surfaces,
   a metallic reinforcing network embedded in said body and extending coextensive throughout the length of said panel,
      the network comprising first opposed reticulated sections spaced interiorly from and between said exterior longitudinally extending body surfaces, and second reticulated sections integrally joined to said first reticulated sections thereby forming a unitary reinforcing assembly,
      said reinforcing assembly resisting deflection resulting from compressive loading of the panel.

2. The building structure of claim 1, further characterized by said body being comprised of a rigid type foam polyurethane.

3. The building structure of claim 1, further characterized by said reticulated sections comprised of a series of interconnected rods.

4. The building structure of claim 1, further characterized by said body having an interior passageway extending coextensive of the length of the body.

5. The building structure of claim 4, further characterized by said passageway having an asbestos lining.

6. The building structure of claim 4, further characterized by said passageway comprising a duct extending coextensive of the length of the body to minimize the amount of resin required for manufacture of the body and to provide a conduit.

7. The building structure of claim 6, further characterized by said duct being of a metallic composition.

8. In a building structure having walls, the improvement comprising
   a structural building panel comprising a component of at least one of said walls and with said panel being arranged to carry compressive loading,
   said panel comprising a rigid type foam body comprised of a molded synthetic resin having exterior longitudinally extending body surfaces,
   a metallic reinforcing network embedded in said body and extending coextensive throughout the length of said panel,
      the network comprising first opposed reticulated sections spaced interiorly from and between said exterior longitudinally extending body surfaces, and second reticulated sections integrally joined to said first reticulated sections thereby forming a unitary reinforcing assembly,
      said reinforcing assembly resisting deflection resulting from compressive loading of the panel,
   said body having a series of passages coextensive with the length of said body and said first and second reticulated sections forming a series of trapezoidal shaped trusses about said passages.

9. In a building structure comprising a plurality of interconnecting barriers, said barriers comprising a plurality of adjoining structural building panels,
   said panels being arranged to carry compressive loading,
   each of said panels comprising a rigid type foam body comprised of a molded synthetic resin having exterior longitudinally extending body surfaces,
   a metallic reinforcing network embedded in said body and extending coextensive throughout the length of said panel,
      the network comprising first opposed reticulated sections spaced interiorly from and between said exterior longitudinally extending body surfaces, and second reticulated sections integrally joining said first reticulated sections thereby forming a unitary reinforcing assembly,
      said reinforcing assembly resisting deflection resulting from compressive loading of the panel.

10. In a building structure comprising a plurality of interconnecting barriers, said barriers comprising a plurality of adjacent structural building panels,
    said panels being arranged to carry compressive loading,
    each of said panels comprising a rigid type foam polyurethane body comprised of a molded synthetic resin having exterior longitudinally extending body surfaces,
    a metallic reinforcing network embedded in said polyurethane body and extending coextensive throughout the length of said panel, the network comprising first opposed reticulated sections spaced interiorly from and between said exterior longitudinally extending body surfaces, and second reticulated sections integrally joining said first reticulated sections thereby forming a unitary reinforcing assembly, said reinforcing assembly resisting deflection resulting from compressive loading of the panel, said first and second reticulated sections forming a series of trusses internally of said polyurethane body to further resist deflection upon loading.

References Cited by the Examiner

UNITED STATES PATENTS

| | | | |
|---|---|---|---|
| 1,406,989 | 2/1922 | Lichtenberg | 52—576 |
| 2,138,683 | 11/1938 | Weesner | 52—310 |
| 2,576,073 | 11/1951 | Kropa et al. | 52—309 XR |
| 2,744,042 | 5/1956 | Pace | 18—59 |
| 2,762,739 | 9/1956 | Weiss | 52—309 |
| 2,780,350 | 2/1957 | Simon et al. | 52—309 XR |
| 2,934,934 | 5/1960 | Berliner | 52—309 XR |
| 2,975,488 | 3/1961 | Brauner | 18—59 |
| 3,000,144 | 9/1961 | Kitson | 52—309 |
| 3,001,333 | 9/1961 | Piana | 52—309 |
| 3,003,199 | 10/1961 | Talmey | 52—309 |
| 3,003,290 | 10/1961 | Lerner | 52—724 |
| 3,082,486 | 3/1963 | Khawam et al. | 18—59 |

FOREIGN PATENTS

| | | |
|---|---|---|
| 68,044 | 10/1957 | France. |
| 1,262,049 | 4/1961 | France. |
| 723,621 | 2/1955 | Great Britain. |

FRANK L. ABBOTT, *Primary Examiner.*

JACOB L. NACKENOFF, HENRY C. SUTHERLAND, *Examiners.*